United States Patent Office 3,641,199
Patented Feb. 8, 1972

3,641,199
URETHANE ELASTOMER WITH ACTIVE HYDROGEN CONTAINING MONOETHYLENICALLY UNSATURATED MONOMER
Warren Dexter Niederhauser, Meadowbrook, Pa., Hector Belmares-Sarabia, Moorestown, N.J., and William Bauer, Jr., Philadelphia, Pa., assignors to Rohm and Haas Company, Philadelphia, Pa.
No Drawing. Filed July 7, 1969, Ser. No. 839,655
Int. Cl. C08g 41/04, 22/00
U.S. Cl. 260—859 R                               28 Claims

ABSTRACT OF THE DISCLOSURE

A urethane elastomeric impact modifier is provided for rigid thermoplastic polymers. Polyester and polyether urethane elastomers are grafted to the acrylic polymers. Preferred is a polyester, diisocyanate and glycol urethane elastomer terminated with a functional monomer capable of ethylenic polymerization grafting with the acrylic polymer. The modified polymers offer an improved balance of physical properties including higher impact strength, clarity, and weather resistance.

---

This invention relates to urethane elastomers which provide useful characteristics in rigid polymers. The urethane elastomer comprises a condensation polymer containing active hydrogen sites which react with diisocyanate compounds to form high molecular weight elastomers. This invention relates to the use of these urethane elastomers in rigid thermoplastics to provide impact resistance and other useful physical characteristics. Rigid polymers that are modified with these urethane elastomers include styrene and acrylic polymers. More particularly, the urethane elastomers may contain additional constituents which provide a refractive index close to that of the rigid polymer to provide a high degree of clarity. These additional constituents include polyols in the preparation of urethane elastomers. This invention also relates to urethane elastomers which contain sites for grafting between the elastomer and the rigid polymer. The grafting provides higher impact strength and improved physical properties over the ungrafted systems.

The preferred embodiments of this invention include urethane elastomers with an equivalent weight of at least 4000. Equivalent weight is the molecular weight divided by isocyanate functionality as determined by isocyanate titration. For example, a urethane elastomer with a molecular weight of 15,000 with terminal isocyanate functionality would have an equivalent weight of 7,500. There is no known upper limit to the equivalent weight of useful urethane elastomers of this invention; however, the more preferred range is 4000 to 50,000. The equivalent weight range most preferred is 10,000 to 30,000. It is also preferred that the glass temperature, hereinafter referred to as $T_g$, of the urethane elastomer, be as low as possible. The $T_g$ is preferred to be below 25° C., and more preferred to be below 0° C. A preferred embodiment is the urethane elastomer modified polymer with a deformation temperature under load of 55° C. or higher (ASTM-648).

We have found evidence to indicate that the morphology of the urethane elastomer and rigid polymer system affects the physical characteristics to a major degree. As the exact molecular configuration cannot actually be seen, all discussion as to morphology is based on the best evidence presently available and represents only our reasoned beliefs. Throughout the specification, when discussing the morphology of the system, the phase containing most of the urethane elastomer may be referred to as the elastomeric phase, and the phase containing most of the rigid polymer will be referred to as the glass phase. Through physical property studies and microscopic examination we believe, although it is as yet not known for sure, that the morphology of the system is affected by a number of factors. These factors include (1) The chemical composition of the urethane elastomors,
(2) The molecular weight of the urethane elastomer,
(3) The amount of the urethane elastomer present in the modified polymer,
(4) The amount of grafting sites on the urethane elastomer that are capable of polymerizing with the rigid polymer,
(5) The chemical composition of the rigid polymer.

We believe that none of these factors is independent and all must be adjusted simultaneously to give the preferred morphology and the balance of physical properties useful for the application of interest.

Rigid thermoplastic polymers are widely used in the manufacture of molding compounds and sheet. These polymers may contain a small degree of crosslinking and still be capable of forming and even flow under heat and pressure. The most notable examples of useful rigid thermoplastics are poly(methyl methacrylate), polyvinyl chloride and polystyrene and the various copolymers thereof. A great deal of effort has been expended in developing modifiers for these rigid thermoplastics. In particular, many modifiers have been developed to increase the impact resistance of rigid thermoplastics. These impact modifiers include styrene and methyl methacrylate copolymers with various types of rubbers and elastomers including butadiene acrylonitrile and acrylic elastomers. These polymers generally impart adverse physical characteristics to the rigid thermoplastics including poorer weather resistance, opacity, and many other physical limitations. Furthermore, these impact modifiers form a two-phase system which is difficult to include in the monomer mix when polymerizing the rigid thermoplastic in the form in which it will be used. An example of this deficiency is during the polymerization of cast acrylic sheet wherein the impact modifier yields poor uniformity due to the two-phase system. For example, there is a great need for acrylic sheet and molding compounds with improved impact strength while retaining the outstanding weather resistance and clarity normally associated with these products. It is, of course, important to retain a good balance of physical properties while obtaining the improved impact resistance. Impact resistance as used throughout this specification refers normally to laboratory tests on small cut samples, but also to resistance of the sheet under use conditions such as impact of a falling object or thrown objects. Impact resistance also refers to the characteristic of the sheet after impact; for example, the resistance of the sheet to stress-whitening after sharp impact.

We have discovered that novel urethane elastomers solve these deficiencies of the modifiers in the prior art and offer a heretofore unobtainable balance of these physical properties. In particular, the urethane elastomers of this invention provide improved impact resistance with an excellent balance of mechanical properties. Further, the use of the urethane elastomers of this invention provides varying degrees of clarity which may be controlled to provide uniform translucence or opacity that is efficient in the distribution of light, and hiding power of the light source. Furthermore, the compositions of this invention provide clear materials that closely approach the clarity of the unmodified rigid thermoplastic. The urethane elastomers of this invention offer excellent weather resistance and in particular provide modified acrylic polymers which are highly resistant to ultraviolet light and outdoor exposure. Other physical characteristics provided by the inclusion of the urethane elastomers of this invention include good abrasion resistance.

The urethane elastomers of this invention comprise the residues of the following three general classes of chemical components reacted together to form the polymeric elastomers:

(A) A chemical compound having at least two active hydrogen sites located on the compound:

(B) A diisocyanate capable of reacting with the active hydrogen sites of group (A);

(C) Optionally, grafting sites in the urethane elastomers which include carbon-to-carbon unsaturation in one of the following general classes of compounds;

(a) α,β-unsaturated dibasic carboxylic acid used in preparing a condensation polymer in group (A), (b) Unsaturated polyol used in preparing a condensation polymer in group (A), (c) Unsaturated polyol in group (A), (d) Unsaturated diisocyanate in group (B), (e) Multi-functional chemical compounds containing first an active hydrogen site capable of reacting with the diisocyanate and second carbon-to-carbon unsaturation to remain on the elastomer to provide grafting sites to the rigid thermoplastic polymer, (f) Multi-functional chemical compounds containing first an isocyanato group capable of reacting with the active hydrogen site compounds and second carbon-to-carbon unsaturation to remain on the elastomer to provide grafting sites to the rigid thermoplastic polymer. The ratio of the compounds chosen from groups (A), (B), and (C) among themselves or between groups is not believed critical. However, preferred embodiments of certain ratios yield certain advantages.

The urethane elastomers of this invention may be intermixed with rigid thermoplastics by any known method. For example, they may be physically mixed with thermoplastic resin to be later melted and molded into useful shapes. The urethane elastomers may be melted into and with the thermoplastic polymer and extruded in the form of molding compounds to be molded into useful shapes at a later time. A preferred embodiment of the invention is the incorporation of the urethane elastomers in the monomers used to prepare the rigid thermoplastics and polymerizing the monomers with the urethane elastomers intermixed therein. In this regard the urethane elastomers of this invention form stable dispersions or solutions in the monomer mix to provide uniform, consistent properties. Other uses for the urethane elastomers of this invention, particularly those containing grafting sites, include the modification of polymers for the manufacture of films, such as acrylic films. The elastomers may be suspended or dispersed in a medium such as water, after which monomers may be suspension or emulsion polymerized onto the elastomer particles to yield useful polymers.

The rigid thermoplastic polymer in a preferred embodiment of the invention may be considered to comprise the following general classes of compounds:

(D) Alkyl methacrylates having a $T_g$ greater than 90° C., including, of particular preference, methyl methacrylate;

(E) Ethylenically unsaturated monomers which are included in sufficient quantities to obtain minor advantages in physical characteristics or merely to reduce the cost of polymer;

(F) Multi-functional monomers that provide special effects at relatively low concentrations. These include, but are not limited to, polyethylenically unsaturated monomers and highly polar monomers which affect the morphology of the modified polymer.

The urethane elastomers of this invention useful in rigid thermoplastics comprise the residue of bis-active hydrogen compounds of group (A) and the aliphatic or alicyclic diisocyanates of group (B). These elastomers may be represented by the following general formula:

I
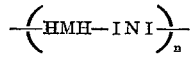

wherein HMH are residues of bis-active hydrogen compounds of group (A), INI are residues of aliphatic or cycloaliphatic diisocyanate compounds of group (B), and $n$ is a number sufficiently high to yield an equivalent weight of at least 4000.

For those elastomers useful in rigid thermoplastics where no grafting is desired between the elastomer and the rigid thermoplastic, it is preferred that the isocyanato functionality be protected. In this embodiment the elastomers may be represented by the following formula:

II

wherein HMH and INI are as previously described and $m$ is a number sufficiently high to yield an equivalent weight of at least 4000. The elastomers of Formula II may be prepared using at least a slight excess of group (A), preferably 0.1 to 100 equivalent percent, more preferably 0.1 to 33 equivalent percent, depending upon the eqivalent weights of the compound of group (A) and of group (B). Thus, the amount of (A) may be as high as 200% of the amount equivalent to the amount of (B) but is preferably from 100.1 to 133% of the equivalent amount of (B). The terminal groups may be replaced by the residue of monofunctional active hydrogen compounds such as alcohols, amines, and the like.

The elastomers of this invention useful in rigid thermoplastics include elastomers containing carbon-to-carbon unsaturation capable of grafting to the rigid thermoplastic. This may be accomplished by choosing the carbon-to-carbon unsaturated versions from groups (A) and (B).

Another embodiment of this invention apart from the use of the elastomers in rigid thermoplastics is the composition of matter of urethane elastomers having terminal ethylenic unsaturation. These terminal unsaturated elastomers may be represented by the following general formulas:

III.
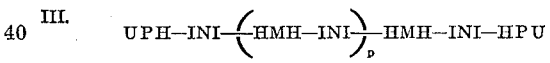

wherein INI and HMH are as previously defined, $p$ is a number sufficiently high to yield an equivalent weight of at least 4000, and HPU or UPH are the same or different active hydrogen compounds containing ethylenic unsaturation of group (C)(e), and IV.
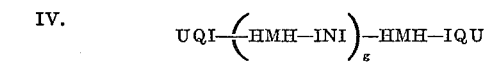

wherein INI and HMH are as previously defined, $g$ is a number sufficiently high to yield an equivalent weight of at least 4000, and IQU or UQI are the same or different isocyanato substituted ethylenically unsaturated compounds of group (C)(f). In the elastomer of Formula III a slight excess of diisocyanate is preferred to yield an intermediate elastomer with definite isocyanate functionality. An equivalent ratio of 1.001 to 2.0 group (B) to 1.000 of Group (A), i.e. the amount of group (A) may be as low as 50% of the equivalent amount of group (B) compounds, is preferred and a ratio of 1.001 to 1.33 of group (B) to 1.000 of group (A) is more preferred.

In the elastomers of Formula IV a slight excess of the active hydrogen compounds is preferred to yield an intermediate elastomer with definite active hydrogen functionality. An equivalent ratio of 1.001 to 2.0 group (A) to 1.000 group (B) is preferred and a ratio of 1.001 to 1.33 is more preferred.

The group (A) chemical compounds containing at least two active hydrogen sites are a recognized class of compounds. Group (A) may contain relatively small quantities of chemical compounds with only one active hydrogen site although these compounds tend to terminate the elastomer chain. Group (A) includes, but is not limited to, condensation polymers, polyamines, polyols, aminoalcohols, and others. The functional groups providing active hydrogen functionality include, but are not limited to, hydroxyl, primary amino, secondary amino, thiol, carboxyl, urylene, amido, urethane, allophanate, and the like. The group (A) compounds used in the preparation of the elastomers of this invention may be used alone although it is common to use two or more to achieve the desired balance of processing characteristics and physical properties desired.

The condensation polymers include those polymers formed by a true condensation reaction liberating water, such as polyesters, and also those polymers that may be prepared from compounds wherein water could have been the reaction product such as the formation of polyethers and polyether glycols. For example, condensation polymers such as polyethers are normally formed from alkoxides but may be prepared from glycols that do indeed liberate water.

The condensation polymers in group (A) such as polyesters and polyethers useful in this invention must contain "active hydrogen" to provide for the addition of or attachment to the isocyanato nitrogen of the diisocyanate. The active hydrogen on the condensation polymer may be a terminal group or it may be located along the chain, thereby providing substantial branching in the urethane elastomer. Water provides an active hydrogen so that it is preferred that the reaction remain anhydrous. The active hydrogen supplied by hydroxyl or carboxyl groups is preferred and hydroxyl termination of the polyester or polyether is more preferred. The condensation polymers useful in this invention include polyesters, polyamides and polyester amides. The condensation polymers also include polyethers or any condensation product containing active hydrogen producing radicals. The condensation polymer is preferred to have a molecular weight of at least 500 up to about 5,000. The condensation polymers of the polyester, polyamide, and polyester amide types may be prepared by the condensation reaction of a dibasic acid with a polyol, an alkanol amine or a polyamine. The polyol generally refers to diols but small quantities of polyols containing more than two hydroxyl groups may be used to obtain branching in the condensation polymer and the urethane elastomer. The condensation polymer may be obtained by reacting combinations of materials of the general classes as follows:

Diols (and/or other polyols) and dibasic acids
Amino alcohols and dibasic acids
Diols, diamines and dibasic acids
Diols, amino alcohols and dibasic acids
Amino alcohols, diamines and dibasic acids
Amino acids, glycols and dibasic acids
Amino acids, amino alcohols and dibasic acids
Amino alcohols, dibasic acid and hydroxy carboxylic acids.

Examples of polyols useful in preparing the above condensation polymers include trimethylol methane, trimethylolpropane, trimethylolethane, pentaerythritol, dipentaerythritol, glycerol and substituted polyols such as monoallyl glycerol. Examples of diols include propylene glycols, dipropylene glycol, polypropylene glycol, ethylene glycol, diethylene glycol, polyethylene glycol, trimethylene glycol, pentamethylene glycol, hexylmethylene glycol, decamethylene glycol, dodecamethylene glycol, 1,12-octadecane glycol, 1,3-butylene glycol, 1,4-butylene glycol, 1,6-hexanediol, neopentyl glycol, 1,4-butene diol, 1,4-butyne diol, 2,2-dimethyl-1,3-propanediol, β-hydroxyethyl thioether, and the like. Mixtures of polyols may be used and mixtures of diols and polyols may be utilized. Under some circumstances, it is useful to add polyol toward the end of the esterification reaction in making the polyester. Preferred diols are chosen from the group of ethylene glycol and 1,2-propylene glycol. Examples of dibasic carboxylic acids useful in preparing the condensation polymers include malonic, succinic, glutaric, adipic, betamethyl adipic, pimelic, suberic, azelaic, sebacic, undecanediolic, brassylic, hexahydroterephthalic, hexahydro-orthophthalic, acetone dicarboxylic, fumaric, and the like and maleic anhydride. Polybasic acids such as trimellitic anhydride may also be used. Preferred dicarboxylic acids include adipic acid, sebacic acid and fumaric acid. Of particular preference is adipic acid.

Amino alcohols useful in preparing the condensation polymer having at least one hydrogen atom attached to the amino and nitrogen atom include 5-aminopentanol, 6-amino-5-methyl hexanol, hydroxyethoxyethylamine, and the like. Preferred amino alcohols may be represented by the formula $$HO-R-NH_2$$

wherein R represents saturated divalent hydrocarbon radicals with a chain length of at least 2 carbon atoms. Typical of these amino alcohols include ethanolamine, 3-aminopropanol, 4-aminobutanol, 6-aminohexanol, and 10-aminodecanol, and the like. Mercaptoalkanols are useful such as mercaptoethanol, 1-mercapto-4-butanol, and the like. Diamines which are useful in preparing the condensation polymers contain at least one hydrogen atom attached to each amino nitrogen atom. The preferred diamines may be represented by the formula $$NH_2-R_1-N-H_2$$

wherein $R_1$ represents saturated divalent hydrocarbon radicals with a chain length of at least two carbon atoms. Typical diamines include ethylene diamine, hexamethylene diamine, 3-methyl hexamethylene diamine, decamethylene diamine, and the like. Polymerizable monohydroxy, monocarboxylic acid or ester forming derivatives thereof may be employed to prepare the condensation polymers. The preferred hydroxy acids may be represented by the formula $$HO-R_3-COOH$$

wherein $R_3$ represents saturated divalent hydrocarbon radicals. Typical hydroxy acids include 6-hydroxycaproic, 10-hydroxydecanoic, 12-hydroxystearic acid. Polymerizable monoamino monocarboxylic acid or ester-forming derivatives thereof may be employed to prepare the condensation polymer. These include 6-aminocaproic, 9-aminononanoic and 11-aminoundecanoic, 12-aminostearic acids and the like. Caprolactam, caprolactone and like compounds are useful, too. Cycloaliphatic diols and triols may be used to prepare the condensation polymers described above, such as 2,2,4,4-tetramethylcyclobutane-1,3-diol, 1,2-cyclohexane diol and the like.

The polyethers useful in preparing the urethane elastomer may be described by the following general structure $$H(OR)_nOH$$

wherein R is a hydrocarbon radical and $n$ is an integer sufficiently high to give a molecular weight of preferably from about 500 to about 5,000. Polyethers may be prepared by condensing an alkylene oxide such as ethylene oxide or propylene oxide or a mixture thereof with each other or with other alkylene oxides to provide a product having terminal hydroxyl groups. Condensation products may also be prepared by condensing ethylene oxide with diols, triols, etc., such as pentanediol-1,5; 2-ethylpropanediol-1,3; 2-methylpropanediol-1,3; hexanediol; cyclopentane-1,2-diol and its polyethers; alpha-alpha'-diols; trimethylolpropane; hexane triols, and other triols.

Of particular preference is the condensation polymer of ethylene and propylene glycol and adipic acid because of its outstanding weather resistance and ease of manufacture. It is preferred that the polyadipate be hydroxyl terminated and that the ethylene glycol to propylene glycol ratio vary from 90:10 to 10:90. The preferred molecular weight of this particular polyester is 1,000–3,000.

The use of polyols having more than two hydroxyl groups in the preparation of the urethane elastomers increases the incidence of the urethane group along the polymer chain. The increase of this incidence affects the refractive index of the urethane elastomers and may allow a closer match with the rigid thermoplastic polymer. Further, the inclusion of a polyol or mixture of polyols allows close control of the compatibility of the urethane elastomer in the liquid monomeric system before polymerization of the rigid thermoplastic polymer. Further, the introduction of the optional polyol may provide additional sites along the chain for branching, or the introduction of an isocyanate functionality for later reaction with a compound capable of grafting with the glass phase.

The term "polyol" as used throughout the specification includes not only diols, but polyols containing more than two hydroxyl groups. Of the diols found most effective, the branched alkanediols affect the miscibility of the urethane elastomers in the liquid monomer system before polymerization of the glass phase and limit the crystallinity of the elastomer. Polyols containing more than two hydroxyl groups may be included in the initial charge of the reactants or may be added at any stage of the reaction. Addition towards the finish of the reaction tends to form terminal polyhydroxy sites on the elastomer.

The polyols of group (A) include, but are not limited to, the polyols mentioned earlier as reactants to form the condensation polymers under group (A). Preferred diols contain 2 to 10 carbon atoms and include 1,3-butanediol, 1,4-butanediol, thioethylene glycol and neopentyl glycol. Useful polyols containing more than two hydroxyl groups include glycerol, trimethylol propane, pentaerythritol and the like.

The equivalent ratio between a mixture of polyol and another active hydrogen functional compound preferably varies from 0.1:0.9 to 0.9:0.1, and more preferably varies from 0.5:1.0 to 1.0:0.5. A mixture of diols and a saturated polyester is the preferred choice of group (A).

The group (B) aliphatic or alicyclic diisocyanates may be saturated or unsaturated. These diisocyanates are preferred in that they yield elastomers with good ultraviolet light and outdoor weather resistance. Saturated aliphatic or alicyclic diisocyanates are more preferred. All known aliphatic and alicyclic diisocyanates may be used in this invention; however, the following general Formulas (V to XV) will serve to provide examples of satisfactory materials. These formulas or the species given for each formula should not be taken to limit the invention.

Examples of diisocyanates useful in this invention may be represented by the following formula:

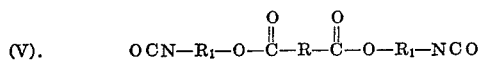

(V).

wherein $R_1$ represents a divalent substituted or unsubstituted aliphatic group containing from 2 to 12 carbon atoms and R represents an alkenylene group containing from 2 to 24 carbon atoms. Particularly preferred compounds of this type are those wherein $R_1$ is a member selected from the group consisting of alkylene, alkenylene, alkynylene, cycloalkylalkylene, cycloalkenylalkylene, and arylalkylene groups containing from 2 to 10 carbon atoms and R has the same value as previously indicated. The divalent $R_1$ groups can be either straight or branched chain and need not be the same throughout the molecule. Illustrative of compounds that are represented by Formula V include bis(2-isocyanatoethyl) fumarate,
bis(2-isocyanato-1-methylethyl) fumarate,
bis(2-isocyanatoethyl) citraconate,
bis(2-isocyanatoethyl) itaconate,
bis(4-isocyanatobutyl) fumarate,
bis(4-isocyanatobutyl) alpha-hydromuconate,
2-isocyanatoethyl-3-isocyanatopropyl glutaconate,
5-isocyanatopentyl-6-isocyanatohexyl itaconate,
bis(10-isocyanato-6-decenyl) fumarate,
bis(3-ethyl-5-isocyanato-3-pentenyl) fumarate,
bis(2-cyclohexyl-3-isocyanatopropyl) itaconate,
bis(4-cyclohexyl-6-isocyanatohexyl) fumarate,
bis(5-cycloheptenolmethyl-8-isocyanatooctyl) fumarate, and the like. The $R_1$ may also represent a divalent cycloaliphatic group which need not be the same throughout the molecule. Illustrative ester diisocyanates wherein $R_1$ is selected from the group consisting of cycloalkylene, cycloalkenylene, cycloalkynylene, alkylcycloalkylene, alkylcycloalkenylene, alkylcycloalkynylene, alkylene cycloalkylene and cycloalkylenealkylene groups containing from four to ten carbon atoms include: bis(2-isocyanatocyclobutyl)-fumarate, bis(4-isocyanatocyclohexyl) glutaconate, bis(5-isocyanato-6-cycloheptenyl) fumarate, bis[2-(2'-isocyanatoethyl)cyclobutyl]fumarate, bis(3-isocyanato-5,6-dimethylcyclohexyl)itaconate, and the like.

Other diisocyanates useful in this invention may be represented by the following formula:

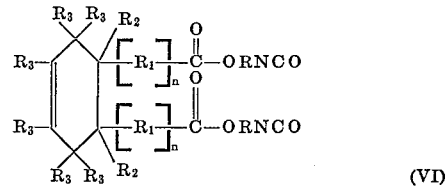

(VI)

wherein R represents a divalent aliphatic or alicyclic group, $R_1$ represents a divalent aliphatic group, $R_2$ represents hydrogen, alkyl or both $R_2$'s taken together can form a single bond, $n$ has a value of 0 or 1, $R_3$ represents hydrogen or lower alkyl of from 1 to 6 carbon atoms. Illustrative of these cyclic ester diisocyanates include the following:

bis(2-isocyanatoethyl)4-cyclohexene-1,2-dicarboxylate,
bis(2,4-diisocyanatobutyl)4-cyclohexene-1,2-dicarboxylate,
bis(8-isocyanato-oct-4-enyl)4-cyclohexene-1,2-dicarboxylate,
bis(4-isocyanatocyclohexyl)4-cyclohexene-1,2-dicarboxylate,
bis(4-isocyanatocyclohexyl-2-enyl)4-cyclohexene-1,2-dicarboxylate,
bis[4-(3-isocyanatopropyl)cyclohexyl]4-cyclohexene-1,2-dicarboxylate,
bis(4-(isocyanatobutyl)cyclohexyl-2-enyl)4-cyclohexene-1,2-dicarboxylate,
bis[4-(5-isocyanatopent-3-enyl)cyclohexyl]4-cyclohexene-1,2-dicarboxylate,
bis(3-methyl-4-isocyanatocyclohexyl)4-cyclohexene-1,2-dicarboxylate,
bis(2-isocyanatoethyl)4-ethylcyclohex-4-ene-1,2-dicarboxylate,
1,2-bis(3-isocyanatopropoxycarbonylmethyl)cyclohex-4-ene, and
bis(isocyanatoethyl)cyclohex-1,4-diene-1,2-dicarboxylate, and the like.

Additional diisocyanates useful in this invention include those represented by the following formula:

(VII)

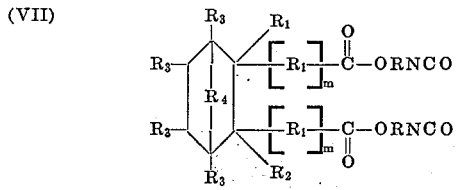

wherein R, $R_1$, $R_2$, $R_3$ and $n$ are as previously defined for Formula VI and $R_4$ represents a methylene (or methyl-substituted methylene). Illustrative examples within this embodiment include:

bis(2-isocyanatoethyl) 5-norbornene-2,3-dicarboxylate,
bis(4-isocyanatobut-2-enyl) 5-norbornene-2,3-dicarboxylate,
bis(4-isocyanatocyclohexyl) 5-norbornene-2,3-dicarboxylate,
2,3-bis(2-isocyanatoethoxycarbonyl-methyl) 5-norbornene, and
bis(2-isocyanatoethyl) 1,4-dimethyl-5-norbornene-2,3-dicarboxylate, and the like.

Additional diisocyanates which are useful in this invention include those represented by the following formula:

(VIII)
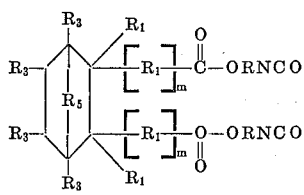

wherein R, R$_1$, R$_2$, R$_3$ and $n$ are as previously indicated for Formula VI and R$_5$ represents divalent oxygen. Typical heterocyclic ester diisocyanates represented by Formula VIII include:

bis(2-isocyanatoethyl)3,6-endo-oxo-4-cyclohexene-1,2-dicarboxylate,
bis(6-isocyanatohex-3-enol)3,6-endo-oxo-4-cyclohexene-1,2-dicarboxylate,
bis(2-isocyanatoethyl)3,6-endo-oxo-1,4-cyclohexadiene-1,2-dicarboxylate, and the like.

Additional diisocyanates useful in this invention include unsaturated ester diisocyanates that can be conveniently represented by the formula:

(IX)
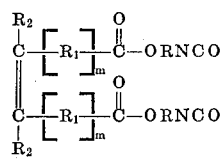

wherein R, R$_1$, R$_2$ and $n$ are as previously indicated for Formula VI. Illustrative unsaturated ester diisocyanates encompassed by Formula IX include:

bis(2-isocyanatoethyl)fumarate,
bis(7-isocyanatoheptyl)itaconate,
bis(4-isocyanato-2-butenyl) glutaconate,
bis(4-isocyanato-2-butenyl-3-isocyanatopropyl fumarate,
bis(4-cyclohexyl-6-isocyanatohexyl)fumarate,
bis(5-isocyanatocycloheptylmethyl) maleate,
and the like.

Additional diisocyanates useful in this invention include carbonate diisocyanates which may be represented by the following formula

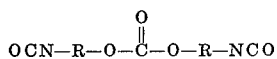

wherein R represents a divalent substituted or unsubstituted aliphatic radical containing from 2 to 12 carbon atoms. Particularly preferred compounds within this embodiment are those wherein R is a member selected from the group consisting of alkylene, alkenylene, alkynylene, cycloalkylalkylene and cycloalkenylalkylene groups containing from 2 to 10 carbon atoms. The divalent radical may be either straight or branched chain and need not be the same throughout the molecule. Illustrative of the isocyanates represented by Formula X include:

bis(2-isocyanatoethyl)carbonate,
bis(7-isocyanatoheptyl)carbonate,
bis(10-isocyanatodecyl)carbonate,
bis(4,4-dimethyl-6-isocyanatohexyl)carbonate,
5-isocyanatopentyl-6-isocyanatohexyl carbonate,
4-isocyanato-2-butenyl-3-isocyanatopropyl carbonate,
bis(4-cyclohexyl-6-isocyanatohexyl)carbonate, and the like. The compounds represented by Formula X may be conveniently prepared by the reaction of the corresponding carbonate diamine or carbonate diamine salt, contained in an inert, normally liquid reaction medium with a carbonyl dihalide and thereafter recovering the diisocyanate product.

Additional isocyanates useful in this invention include difunctional sulfonyl isocyanates which can be represented by the following formula:

(XI) 

wherein R is a divalent aliphatic or cycloaliphatic radical. Illustrative of the difunctional sulfonyl isocyanates represented by Formula X include: 1,2-ethane-bis(sulfonyl isocyanate), 1,6-hexane-bis(sulfonyl isocyanate), and the like.

Additional isocyanates useful in this invention may be represented by the following formula:

(XII). 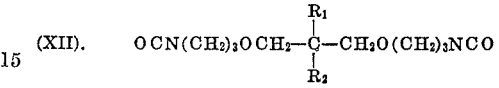

wherein R$_1$ and R$_2$ are selected from the group consisting of lower alkyl, lower haloalkyl, cyclohexyl and gamma-aminopropoxy lower alkyl. Illustrative of the aliphatic isocyanates of Formula XII include: 1,3-bis-(gamma-isocyanatopropoxy)2,2-dimethylpropane, 1,3-bis-(gamma-isocyanatopropoxy)-2-methyl-2-propylene.

Additional diisocyanates useful in this invention include ester isocyanates that may be represented by the following general formula:

(XIII) 

wherein R is the diester residue of a diol having two primary hydroxyl groups, from 2 to 18 carbon atoms and up to one hetero oxygen or sulfur atom, R$_1$ and R$_2$ are divalent organic radicals selected from the group consisting of alkylene and cycloalkylene. Illustrative of the compounds represented by Formula XIII include beta-isocyanatoethyl - 6 - isocyanatocaproate, beta-isocyanato-3 - isocyanatopropionate), 1,6-di(6-isocyanatocaproyloxyl)hexane and the like.

Additional ester diisocyanates useful in this invention may be represented by the following formula:

(XIV) 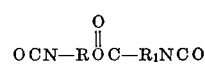

wherein R is alkylene or cycloalkylene and R$_1$ is alkylene containing 5 to 7 carbon atoms. Illustrative compounds represented by Formula XIV include: 2-isocyanatoethyl-6 - isocyanatohexanoate, 4 - isocyanato-butyl - 5 - isocyanatopentanoate, and the like.

Additional diisocyanates useful in this invention include alkylene diisocyanates that may be represented by the following general formula:

(XV) 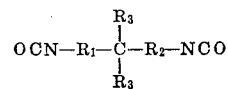

wherein R$_1$ and R$_2$ represent branched or linear alkylene and alicyclic groups containing 2 to 12 carbon atoms and R$_3$ represents hydrogen or lower alkyl. Examples illustrative of the compounds of Formula XV include: bis(4-isocyanatocyclohexyl)methane, nonamethylenediisocyanate, bis(6-isocyanato - 2 - ethylhexyl)ethylmethane, 2,4,4-(2,2,4)trimethylhexane - 1,6 - diisocyanate, 2,2,4-trimethylhexane-1,6-diisocyanate, and the like. Other diisocyanates useful in this invention include 3-isocyanatomethyl - 3,5,5 - trimethylcyclohexylisocyanate and similar compounds. Useful commercial diisocyanates include "DDI diisocyanate" offered in commerce by the Chemical Division of General Mills, Inc., Kankakee, Ill. as described in their Bulletin 8–65 dated Sept. 29, 1965.

The diisocyanates of this invention are known compounds that may be prepared by methods known in the art. Detailed methods of preparation of most of these diisocyanates, although not necessary to this application, may be found in such U.S. patents as Nos. 3,427,346; 3,275,679; 3,162,664; 3,280,184; 3,267,122, and others.

The group (C) grafting sites are incorporated in the urethane elastomers through the introduction of carbon-to-carbon unsaturation in any of the compounds of group (A) and (B) or any mixtures of these groups. The (C) (a), (b), and (c) grafting sites are included in the elastomer through the use of unsaturated versions of the bis-active hydrogen functional compounds. For example, the unsaturation may be included as unsaturated condensation polymers. Compounds found most useful in preparing these unsaturated condensation polymers include unsaturated dibasic carboxylic acids and anhydrides such as fumaric acid, maleic anhydride, itaconic acid, citraconic acid, glutaconic acid, and the like, and diols such as butenediols, butynediols, and the like. These unsaturated diols may also be used as separate compounds in the preparation of the elastomer to provide unsaturation. The group (C)(d) unsaturated diisocyanates found most useful in providing unsaturation in the elastomer include bis-isocyanatoethyl fumarate, bis-isocyanatobutyl citraconate, and the like.

A preferred embodiment of this invention are urethane elastomers which are prepared without carbon-to-carbon unsaturation but contain reactive groups such as isocyanate or active hydrogen functionality which may be further reacted with multifunctional compounds to provide carbon-to-carbon unsaturation. Of particular preference are the urethane elastomers with no carbon-to-carbon unsaturation but with isocyanate or active hydrogen functionality at the terminal portions of the elastomer which are reacted with multifunctional compounds that provide carbon-to-carbon unsaturation at these terminal points. In preferred embodiments an excess of the diisocyanate is used to prepare the urethane elastomer, leaving unreacted isocyanate functionality in the intermediate elastomer. This elastomer is capable of reacting with unsaturated monomers containing active hydrogen. It is preferred that the elastomer molecular chain contain at least an average of 1.0 grafting sites, more preferred at least 1.7 and most preferred at least an average of 1.9 grafting sites. Grafting is important to obtain the highest impact strength possible for the composition. The number of grafting sites preferred may be described in terms of the equivalent weight of the elastomer. Preferred is at least 0.5 per 10,000 equivalent weight, more preferred is at least 1.0 per 10,000 equivalent weight. Most preferred is the range of 0.5 to 1.5 grafting sites per 10,000 equivalent weight. For example, the grafting site compounds under groups (C)(d) and (C)(e) may be described as ethylenically unsaturated compounds containing active hydrogen or isocyanato functionality.

When using group (C)(c) the active hydrogen functionality such as hydroxyl, amino and the like reacts with the isocyanate functionality on the intermediate urethane elastomer, leaving pendant or terminal carbon-to-carbon unsaturated functionality that is capable of reacting with the monomers of the glass phase. Typical examples of these grafting site compounds include, but are not limited to, β-hydroxyethyl methacrylate, hydroxymethyl methacrylate, hydroxybutyl methacrylate, hydroxymethyl acrylate, hydroxyethyl acrylate, hydroxybutyl acrylate, β-hydroxyethylvinyl sulfide, β-hydroxyethylvinyl ether, allyl alcohol, acrylic acid, methacrylic acid, t-butylaminoethyl methacrylate and the like.

When the unsaturation is introduced as a compound or mixture of compounds from group (C)(e), the intermediate elastomer contains active hydrogen sites. The compounds of group (C)(e) contain functionality capable of reacting with these active hydrogen sites. This functionality includes isocyanato, carboxylic acid, and the like. Typical compounds of group (C)(e) include β-isocyanatoethyl methacrylate, 6 - isocyanato-n-hexyl methacrylate, 2 - isocyanatoisopropyl acrylate, acryloyl chloride, methacryloyl chloride, maleic anhydride, methacrylic acid, and the like.

Grafting the elastomers of this invention to rigid thermoplastics provides increased impact strength, reduced stress whitening, high modulus, better thermoformability and in general an improved balance of physical properties.

A preferred embodiment of the invention is the urethane elastomer comprising 40 to 60 mole percent of saturated or unsaturated aliphatic or alicyclic diisocyanate (A), 30 to 60 mole percent of active hydrogen functional compounds (B), and up to 10% of an ethylenically unsaturated monomer containing either at least one active hydrogen site (C)(e) or at least one functional group capable of reacting with an active hydrogen site (C)(f). An aditional preferred embodiment of the invention is a urethane elastomer comprising the residue of 15 to 24.9 mole percent of a saturated polyester containing active hydrogen sites, 50 to 60 mole percent saturated aliphatic or alicyclic diisocyanate, 15 to 25 mole percent of a diol and 0.1 to 10% of an ethylenically unsaturated compound having active hydrogen functionality, wherein sufficient diisocyanate is incorporated to provide excess isocyanate functionality for reacting with the ethylenically unsaturated active hydrogen site monomer. An additional preferred embodiment of this invention is the urethane elastomers comprising a saturated polyester having hydroxyl termination, a saturated or alicyclic aliphatic diisocyanate, alkane diol and a hydroxyl functional ethylenically unsaturated compound.

The use of these urethane elastomers in certain thermoplastic polymers is a preferred embodiment of this invention. The invention comprises the use of the urethane elastomers in acrylic polymers and styrene polymers. A preferred embodiment includes the polymerization of a monomer comprising at least 55% of (D) an alkyl or cycloalkyl ester of methacrylic acid, the homopolymer of which has a $T_g$ greater than 90° C., 0 to 45% of (E) ethylenically unsaturated monomers which, when polymerized with the alkyl methacrylate (E), yields a copolymer with a $T_g$ greater than 50° C. and 0 to 5% of (F) polyfunctional monomer capable of crosslinking the rigid thermoplastic polymer or having highly polar substituents attached thereto. A more preferred embodiment of the invention is the polymerization of a monomer system with the urethane elastomers intermixed therein, said monomer system comprising at least 55% methyl methacrylate, 0 to 45% of an ethylenically unsaturated monomer system chosen from the group consisting of methyl acrylate, alkyl esters of acrylic and methacrylic acids wherein the alkyl group contains 2 to 30, and preferably 2 to 15, carbon atoms, substituted alkyl esters of acrylic acid and methacrylic acid including halogen, alkoxy, alkylthio, cyano and other substitution, styrene monomers and substituted styrene monomers, both on the aromatic ring and on the α-carbon atom, cyclic esters of methacrylic acid and acrylic acid including isobornyl, norbornyl, fenchyl, isofenchyl, cyclohexyl acrylates and methacrylates, and 0 to 5% of a polyfunctional monomer chosen from the group consisting of polyethylenically unsaturated monomers, preferably polyacrylated and polymethacrylated polyols and highly polar monomers such as methacrylic acid, acrylic acid, hydroalkyl esters of acrylic and methacrylic acid, acrylonitrile, methacrylonitrile, acrylamide, methacrylamide, and the like.

The rigid thermoplastic polymer to be modified is preferably polymerized with the urethane elastomer intermixed in the monomer system and more preferably with the elastomer dissolved therein. A preferred embodiment of the invention utilizes the monomer system useful in preparing an acrylic polymer. The monomer group (D) comprises alkyl esters of methacrylic acid having a $T_g$ greater than about 90° C. The use of these monomers provides a final composition of the unmodified polymer with a service temperature greater than about 50° C. depending upon the choice of other monomers in the thermoplastic polymer. The alkyl esters of group (D) include methyl methacrylate, isobutyl methacrylate, cyclohexyl methacrylate, isobornyl methacrylate, norbornyl methacrylate and other acrylates. Aromatic methacrylates may also be used such as benzyl methacrylate. Of particular preference is methyl methacrylate. It is preferred that the group (D) monomers comprise at least 55% by weight of the thermoplastic polymer. In those polymers where the ultimate in outdoor weather resistance and rigidity is desirable, at least 90% methyl methacrylate should be used and preferably 95% to 100% methyl methacrylate.

Other ethylenically unsaturated monomers may be included in the preferred acrylic polymer in group (E). These may be any known monomers such as styrene, substituted styrene such as alkyl-substituted styrenes such as vinyltoluene, α-methylstyrene, o-p-dimethylstyrene, p-tert-butylstyrene, p-ethylthioethylstyrene, p-methoxystyrene and the like; halogenated styrenes such as p-chlorostyrene, meta-bromostyrene, dichlorostyrenes, and the like; and acrylic monomers such as methyl acrylate, and alkyl esters of methacrylic and acrylic acid wherein the alkyl group may be ethyl, propyl, isopropyl, butyl, isobutyl, 2-ethylhexyl; substituted alkyl methacrylates and acrylates such as ethylthioethyl methacrylate and acrylate, methoxyethyl methacrylate and acrylate and longer chain alkylthioalkyl and alkoxyalkyl acrylates and methacrylates, halogenated alkyl methacrylates and acrylates such as chloroethyl methacrylate, α-chloropropyl acrylate, and the like. Other monomers that may be included in this list without substantially changing the character of the rigid polymer include acrylonitrile, methacrylonitrile, vinyl chloride, vinyl acetate, and other monomers known to those skilled in the art. These other ethylenically unsaturated monomers are added to obtain special effects and may be included up to 45% of the weight of the rigid thermoplastic polymer. Alkyl acrylates such as ethyl acrylate are preferably added in quantities up to about 10% and, more preferably, up to quantities of about 5% to obtain improved impact resistance. The cyclic methacrylates added as either group (D) or group (B) monomers raise the deformation temperature under load. It is preferred to use group (E) monomers in quantities of no more than about 10%.

The specialty monomers of group (F) are generally used in quantities up to about 10% by weight of the thermoplastic polymer. These functional monomers provide major effects in the physical characteristics of the urethane elastomer-modified rigid thermoplastic polymer. These functional monomers include polyethylenically unsaturated monomers which apparently affect the morphology of the system and thereby affect many of the physical properties to a major degree. These crosslinking monomers may be used in much higher quantities than normally possible while retaining good thermoformability. A preferred embodiment utilizes up to 5% of these crosslinking monomers while retaining thermoformability that approaches that of standard acrylic sheet. Polyethylenically unsaturated monomers include, but are not limited to, polyacrylated and methacrylated polyols such as 1,3-butylene dimethacrylate or acrylate, ethylenediacrylate or dimethacrylate, trimethylolethane diacrylate or dimethacrylate, trimethylolethane triacrylate or trimethacrylate, trimethylolpropane diacrylate or dimethacrylate, trimethylolpropane triacrylate or trimethacrylate, glyceryl diacrylate or dimethacrylate, glyceryl triacrylate or trimethacrylate, pentaerythritol diacrylate or dimethacrylate, pentaerythritol triacrylate or trimethacrylate, divinylbenzene, trivinylbenzene, and other polyethylenically unsaturated monomers capable of cross-linking rigid thermoplastics based on methyl methacrylate or styrene monomers. The preferred crosslinking monomers include 1,3-butylene dimethacrylate and diacrylate, trimethylolethane triacrylate, trimethylolpropane trimethacrylate and triacrylate.

The functional monomers of group (F) may also include highly polar monomers. These highly polar monomers apparently affect the morphology of the system. These polar monomers also tend to affect the compatibility or the miscibility of the urethane elastomers in the liquid monomer system used to polymerize the rigid thermoplastic polymer phase. It is preferred that up to 5% of these functional monomers be used in the monomer system to prepare the rigid thermoplastic. Preferred highly polar monomers include: β-hydroxy-ethyl methacrylate, β-hydroxy-propyl methacrylate, acrylic acid, methacrylic acid, acrylamide, acrylonitrile, methacrylonitrile and methacrylamide.

The molecular weight of the rigid thermoplastic polymer is not critical to this invention. The molecular weight of the rigid thermoplastic polymers useful in the art varies over a wide range, and the molecular weight of the thermoplastic polymers may be as low as 50,000, preferably no lower than 75,000. It is common for injection molding compounds to have a molecular weight as high as 200,000. In cast sheet applications, particularly cast acrylic sheet, the molecular weight may be as high as one to three million. When a crosslinking monomer is present in the composition, it is difficult to determine the weight to an exact degree. Also, when the urethane elastomer is grafted onto the rigid thermoplastic polymer, the molecular weight determination is difficult. In all cases, when molecular weight is mentioned in this specification, it is that molecular weight which would be obtained if the crosslinking monomer or the graftable urethane elastomer were not present. Naturally, the grafting of the urethane elastomer onto the thermoplastic polymer raises the total molecular weight to an extremely high value that is essentially impossible to measure using present technology.

The urethane elastomers of this invention are prepared under anhydrous conditions by mixing the isocyanate, the condensation polymer having active hydrogen sites, the polyol, if present, and a catalyst such as a tin salt which will provide tin ions, and placed in a reactor. It is preferred that the isocyanate and the tin salt be placed in the reactor first, followed by the stepwise addition of small quantities of the condensation polymer and the polyol, if present. If the urethane elastomer is to be used as a solution in a monomer, such as methyl methacrylate, the condensation polymer, and the polyol if present, may be added as a solution in the methyl methacrylate monomer. An inert solvent may be substituted for the methyl methacrylate monomer. Reaction takes place over a number of hours and the product may be used directly by polymerization of the monomer with a free-radical catalyst and heat with or without additional monomer present. If grafting sites are to be added by the inclusion and reaction of another compound, additional catalyst may be necessary such as an additional tin salt. Other catalysts may be used but tin salts are preferred. Stannous octoate is preferred. Useful catalysts for the preparation of the elastomer that may be used include but are not limited to: Lewis acids such as lead and zinc salts; strong bases such as aluminum isopropoxide; Lewis bases such as diethylamine, triethylenediamine and others. The polymerization of the rigid thermoplastic polymer with or without the urethane elastomer present is essentially the same. The method of polymerization of the monomer may be any method known to those skilled in the art. For molding compounds it is common to polymerize the monomer in cellophane bags. For this use, lower molecular weights are necessary and a chain regulator is usually employed. Such compounds include but are not limited to mercaptans such as n-, sec.-, and tert-dodecyl mercaptan, and n-, sec.-, and tert.-butyl mercaptans, 2-mercaptoethanol, and other compounds such as carbon tetrachloride, carbon tetrabromide, bromoform, ($C_1$–$C_{12}$)alkyl thioglycolates, methallyl chloride, benzyl chloride, dipentene, tepineols, 1,3-cyclohexadiene, diallylether, 1,4-pentadiene, bimethallyl, and the like. The mercaptans are preferred. If the modified rigid thermoplastic polymer is to be prepared in sheet form, it may be cast by any known method in the art. Satisfactory methods include continuous casting methods and the cell casting methods. Depending upon the heat transfer conditions, the sheet may be cured at temperatures from 60 to 140° C.

Any free radical catalyst may be used and benzoyl peroxide, lauroyl peroxide, acetyl peroxide and the like are useful in initiating polymerization of the monomer system.

As suggested earlier in this specification, it is believed that the morphology of the compositions of this invention is important before, during, and after polymerization of the monomer system. It is preferred, although it is not critical to the advantages of the invention, to choose the chemical components of the urethane elastomer and the chemical composition of the rigid thermoplastic polymer to provide a stable suspension or emulsion or even a solution in the liquid phase before polymerization. It is easier to handle a liquid or stable dispersion or suspension in casting procedures and in continuous equipment. During polymerization, it is believed—although we have found it impossible to determine for sure—that the morphology of the system during the polymerization affects the physical characteristics of the final modified polymer. It is reasonable that the morphology during polymerization will affect the particle size of the discontinuous phase and the characteristic of the continuous phase. During polymerization, it is believed that some of the systems of this invention undergo a phase inversion at certain temperatures or during polymerization. Phase inversion takes place when the liquid monomer system is the continuous phase before polymerization but becomes the discontinuous phase during or after polymerization, thereby leaving the elastomeric phase as the continuous phase. Phase inversion may take place vice versa. The compositions of this invention may have either the continuous glass phase or continuous elastomer phase. In certain compositions there may be both continuous glass phase and continuous elastomer phase, depending upon the location in the casting. This inconsistency throughout the part is generally not preferred. The factors which affect the morphology of the urethane elastomer modified polymer have been enumerated earlier and it is clear that these factors are not independent, and it is clear that to obtain a certain balance of physical properties, all of these factors must be considered.

A specific example in which the morphology may be controlled is the saturated polyester, aliphatic diisocyanate and glycol reacted together to form an elastomer subsequently terminated by hydroxy allyl methacrylate. Depending upon the particular components chosen, this urethane elastomer, when placed in a mixture with methyl methacrylate monomer, that is, polymerized, changes from a glass continuous phase to an elastomer continuous phase in the range of 15 to 20% by weight urethane elastomer on the total weight of the modified polymer. This change point may be affected by small changes in the composition of the glass phase. The addition of small quantities of a crosslinking monomer or a highly polar monomer or combinations of both will tend to form an elastomer continuous phase at a lower concentration of urethane elastomer than normal. In a similar fashion, the changes in any of the factors listed earlier, will affect the morphology. It is important to know that the morphology is not critical to the general utility of this invention and only enters into the choice of the particular physical characteristics desired for the particular end use. For example, switching the continuous and discontinuous phases with only minor changes in the composition will affect the physical characterics of the sheet a great deal. An example of similar compositions with different morphologies will yield a relatively rigid system with a flexural modulus in the range of 300,000 to 350,000 p.s.i. and medium impact strength of 1.0 ft.-lbs. per inch of notch in the notched Izod impact test with the glass phase being continuous. When the minor change occurs to shift the morphology such that the elastomer phase is continuous, the higher impact strength of 1.5 to 2.0 ft.-lbs. per inch of notch is obtained and the modulus drops to the range of 200,000 to 250,000 p.s.i. Changes in morphology affect other physical properties, particularly outdoor weather resistance and hazing upon contact with humidity. One of the advantages of the invention is the control over the physical characteristics by only minor changes in the composition, to affect the morphology of the modified polymer. For example, a more rigid polymer with the continuous glass phase is preferred for window glazing application. Of course, as indicated before, the concentration of the elastomer in which the change in morphology takes place may be adjusted up or down the scale of the amount of elastomer present. Likewise, it is possible to obtain an extremely rigid composition with a relatively high amount of urethane elastomer present by pushing the point at which the morphology changes up the scale of the amount of elastomer present. These controls provide on extremely versatile composition. The amount of urethane elastomer useful in modifying rigid thermoplastics varies over a wide range depending upon the composition of the elastomer, the composition of the rigid polymer and the physical properties desired for the immediate application. In general, there is little effect on the impact resistance by adding up to 5% of the elastomeric material. There is no known upper limit as to the amount of elastomer useful although it is not generally desirable to utilize more than about 50% of the urethane elastomer. As the amount of the urethane elastomer is increased, the impact resistance increases and the modulus of the modified polymer decreases. It should be noted that the balance of these two physical properties is important and this invention provides an excellent balance between these two physical properties. The exact values obtained depend upon the chemical compositions utilized, but it is common for the impact strength to increase steadily as the amount of modifier is increased until phase inversion takes place. It is common for the glass phase to be continuous at low concentrations of the urethane elastomer. The increase in impact strength per unit of elastomer added increases relatively slowly. After inversion, further icnreases in the amount of elastomer present yield a sharp increase in impact strength.

The modified polymers of this invention are believed to comprise two phases. It is reasonable to expect opacity when these two pases are of differing refractive indices. We have found that it is possible to match the refractive indices of the two phases to obtain almost crystal clarity. In acrylic polymer systems, it is generally necessary to choose the composition of the urethane elastomer to obtain a sufficiently high refractive index without utilizing compounds that will be unstable to ultraviolet light. Components that yield a relatively high refractive index in the elastomeric phase include the use of a polyester and a branched chain glycol. The increased incidence of urethane functionality occurrence raises the refractive index of the elastomer. In general, polarizable functions on the elastomer yield higher refractive indices. The opaciy of the polymer may be adjusted by careful choice of the chemical compositions and, for many applications, translucency is desirable for the end use such as in lighting applications to hide the light source and distribute the light output in an even fashion. Clear modified thermoplastics are preferred.

It is indicated that it is desirable to have the urethane elastomer soluble or at least dispersible in the liquid monomer. This is obtained by careful choice of the elastomer composition, in particular the aliphatic diisocyanate. Factors that improve the solubility and miscibility of the elastomer in the liquid monomer include: the use of branched alkyl chain diols, the use of thioether diols, and lower molecular weight elastomer. Graftable elastomers based on aromatic diisocyanates may be prepared by this invention, but ultraviolet light stability is limited. Modified thermoplastics containing this type of elastomer may be protected from degradation by a coating or film, such as an acrylic film. The following are illustrative examples. Percentages are by weight.

EXAMPLE 1

The following materials are used to prepare a urethane elastomer:

| Materials | Specific gravity | Equivalent weight [1] | Number of equivalents | Parts by weight |
|---|---|---|---|---|
| Bis(4-isocyanatocyclohexyl)-methane (BICHM) | 1.07 | 131.6 | 2.438 | 320.8 |
| Poly(ethylene glycol/propylene gylcol [80/22] (EG/PG AD) | 1.2 | 967 | 1.00 | 967.0 |
| 1,3-butylene glycol (1,3 BG) | 1.00 | 45.05 | 1.30 | 58.6 |
| β-hydroxyethyl methacrylate (HEMA) | 1.0 | 130 | [2] 0.138 | 120.0 |

[1] Equivalent Weight is the molecular weight divided by the reactive functionality.
[2] Plus excess.

The glassware is dried at 100° C. in a vacuum overnight. Water contamination from the equipment, the atmosphere and the reactants, should be avoided carefully. The BICHM and 0.6 gr. of stannous octoate is placed in a dried 5-liter, 3-necked round-bottomed flask provided with a stirrer, reflux condenser topped with a drying tube and an addition funnel with pressure equalizer. Using an external oil bath, the temperature is adjusted to 50° C. The EG/PG AD and the 1,3 BG are dissolved in 261 ml. of dried methyl methacrylate (MMA). This solution is added dropwise over a period of 4 hours with moderate stirring. The reaction is continued for 5 to 9 hours after which 750 ml. of dried MMA is added. The reaction is complete as determined by a constant equivalent weight by isocyanate titration after 12 to 15 hours. The exotherm during the addition of the polyester and glycol is easily controlled by removal of the oil bath periodically. The equivalent weight by isocyanate titration is 6700 units. The HEMA and 0.6 gr. stannous octoate is added and the reaction is continued for 3½ hours at 50° C. The solids content at the end of the reaction is 55.8%.

EXAMPLE 2

The preparation of the urethane elastomer in Example 1 is repeated except that the 1,3-butylene glycol is replaced by 0.845 equivalent 1,3-butylene glycol and 0.368 equivalent 1,4-butylene glycol (1,4-BG), and 2.346 equivalents BICHM are used. The equivalent weight of the urethane elastomer before reaction with the HEMA is in the range of 10,000 to 12,000. The solids content is 48.6% in the MMA.

EXAMPLE 3

The method of preparation of the urethane elastomer in Example 1 is repeated using the following reactants:

| Ingredient | Number of equivalents | | |
|---|---|---|---|
| | 3A | 3B | 3C |
| 2-isocyanatoethyl-6-isocyanatohexanoate (IEIH) | 3.3 | 2.2 | 3.3 |
| EG/PG AD | 2.0 | 1.0 | 1.0 |
| 1,4 BG | 1.0 | 1.0 | 2.0 |
| HEMA (excess used) | 0.3 | 0.2 | 0.3 |

EXAMPLE 4

Example 1 is repeated except that the reactants are as follows:

Material: Number of Equivalents
- IEIH — 3.3
- EG/PG AD — 1.0
- 1,4 BG — 3.0
- Trimethylolpropane — .06
- HEMA (excess used) — 0.24

EXAMPLE 5

Example 1 is repeated except that the reactants are as follows:

Material: Number of equivalent
- BICHM — 1.590
- EG/PG AD — 1.0
- Thiodiethyene glycol — 0.5
- HEMA (excess used) — 0.09

EXAMPLE 6

Example 1 is repeated except that the following reactants are used:

Material: Number of equivalent
- BICHM — 2.6
- EG/PG AD — 1.0
- 1,3 BG — 1.3
- HEMA (excess used) — 0.3

EXAMPLE 7

Example 1 is repeated except that the reactants are used:

Material: Number of equivalent
- BICHM — 2.346
- EG/PG AD — 1.0
- 1,3 BG — 0.345
- 1,4 BG — 0.368
- t-Butylaminoethyl methacrylate (excess used) — 0.133

EXAMPLE 8

Example 1 is repeated except that the following reactants are used:

Material: Number of equivalent
- IEIH — 3.3
- Polymeg 2000 [a] — 1.0
- 1,4 BG — 2.0
- HEMA (excess used) — 0.3

[a] Polymeg 2000 is a commercially available polyether offered in commerce by The Quaker Oats Company, Cleveland, Ohio.

EXAMPLE 9

Example 1 is repeated except that the following reactants are used:

Material: Number of equivalent
- IEIH — 3.3
- Poly(ethylene adipate) — 1.0
- 1,3 BG — 2.0
- HEMA (excess ued) — 0.3

EXAMPLE 10

Example 1 is repeated except that the following reactants are used:

Material: Number of equivalent
- IEIH — 2.267
- EG/PG AD — 1.0
- Neopentylene glycol — 1.08
- HEMA (excess used) — 0.187

EXAMPLE 11

Using the procedure of Example 1, urethane elastomer is prepared by reaction of equivalent weights of IEIH and EG/PG AD.

EXAMPLE 12

The urethane elastomer solution in methyl methacrylate prepared in Example 1 (58.8 solids) is separated into aliquots and mixed with additional methyl methacrylate such that the amount of the urethane elastomer varies from 5 to 30% by weight. Catalyst in the amount of 0.03% of a solution of 25% acetyl peroxide in dimethyl phthalate is added. The mixes are then placed into cells prepared from glass plates on which an appropriate release agent is applied with spacers, and dams are affixed to prevent leaking. The filled glass plate molds are cured on a temperature schedule from 60° C. to 120° C. by methods known in the art. The cured castings are removed from the molds, exhibiting increasing impact strength with increasing concentration of urethane modifier. The castings exhibit glass-like clarity and as the concentration of the elastomer approaches 30%, the modulus drops below 200,000 p.s.i. The castings exhibit good solvent craze resistance.

EXAMPLE 13

A casting mix is prepared by mixing 2870 gr. of the polyester urethane elastomer prepared in Example 2. The polyester urethane elastomer solution (48.6% solids) as prepared in Example 2, and 3260 gr. MMA is warmed to 43° C. with occasional shaking until a homogeneous mixture is obtained. To the mixture is added 62 gr. 1,3-butylene dimethacrylate, 155 gr. HEMA and 2 gr. of a 25% solution of acetyl peroxide in dimethyl phthalate. Appropriate ultraviolet stabilizers and alternative catalysts may be used. The mold is prepared using the methods of Example 12, and the filled mold is placed under a pressure of 40 p.s.i.g. and heated to 80° C. over a period of 30 minutes. Temperature is increased to 130° C. during a period of two hours. The casting removed after cooling is transparent with very low haze. Typical test values obtained on the sheet include a modulus of 235,000 p.s.i. and Izod notched impact strength (IZOD) of 1.6 ft.-lbs. per inch of notch. Variable height impact resistance (VH impact) values on the sheet are 48 inch-lbs. The VH impact values are obtained on a variable height impact tester supplied in commerce by Gardner Laboratories Inc., Bethesda, Md. In this test a steel slug weighing 2 or 4 pounds is dropped from various heights to an impactor in the form of a dart with a $\frac{3}{16}''$ tip radius resting in contact with the sample. The force measured in inch-pounds is reported at which 50% break is obtained.

A casting prepared from methyl methacrylate alone yields a modulus of 430,000 p.s.i., IZOD of 0.3 ft.-lb./inch of notch, and VH impact of approximately 3 inch-lbs.

EXAMPLE 14

Castings are prepared using the procedure of Example 13 using a charge of 15% of the elastomers as prepared in Example 3 and 85% MMA. Typical values obtained from these sheets include:

| Value | Casting containing elastomer | | |
|---|---|---|---|
| | 3A | 3B | 3C |
| Clarity (visual) | Translucent | Translucent | Clear |
| Young's modulus (p.s.i.) | 241,000 | 248,000 | 269,000 |
| IZOD (ft-lbs./inch of notch) | 0.53 | 1.12 | 1.13 |

EXAMPLE 15

A casting mix is prepared of 35 parts of the polyester urethane elastomer solution (50% elastomer in MMA) as prepared in Example 4, 62.8 parts MMA, 2.0 parts ethyl acrylate (EA), and 0.05 part of a 25% solution acetyl peroxide in dimethyl phthalate. This is mixed in a blender at high speed. The casting mix is charged to a mold and polymerized under a pressure of 40 p.s.i.g. over a temperature range of 100–135° C. for a period of two hours. The transparent casting obtained has an IZOD of 1.4 ft.-lbs. per inch of notch, a VH impact of 58 in.-lbs., and a Young's modulus of 220,000 p.s.i. Replacement of up to four parts of the MMA with EA yields an IZOD of 1.9 ft.-lbs. per inch of notch and increases the VH impact to over 100 in.-lbs. while lowering the Young's modulus to 190,000 p.s.i.

EXAMPLE 16

A series of casting mixes is prepared from the polyester urethane elastomer prepared in Example 5 containing varying amounts of the elastomer, from 15–30% by weight.

The mixes were catalyzed and gently agitated at room temperature, charged to a mold and cured, using the procedure of Example 13 to yield tough, transparent sheets. Typical VH impact at which 50% failure is observed are ~3; 16; 12; 16; 38; greater than 70; and greater than 70 inch-lbs. for the modifier levels of 0; 15, 17.5; 20; 22.5; 25; and 30% respectively.

EXAMPLE 17

A casting mix is prepared by warming 420 gr. of the polyester urethane solution prepared in Example 6 (51.9% solids) and 827 gr. MMA at 50° C. with stirring for one hour. The mix was cooled to 40° C. and 0.05% acetyl peroxide solution was added. The mix was split into 6 aliquots. One mix (A) was cast without further modification. Levels of 0.1; 0.2; 0.3% of n-dodecyl mercaptan (mixes B. C. and D respectively) and levels of 0.1 and 0.3% 1,3-butylene dimethacrylate were added to the remaining two aliquots (mixes E and F respectively). Polymerization using the method of Example 13 provides transparent materials with the following values:

| Sample: | IZOD—ft.-lbs. per inch of notch |
|---|---|
| A | 0.92 |
| B | 0.89 |
| C | 0.78 |
| D | 0.79 |
| E | 1.19 |
| F | 1.17 |

EXAMPLE 18

A casting is prepared using procedure of Example 13, but with a charge of 20% elastomer prepared in Example 7 and 80% MMA. The casting is rigid, transparent and ductile.

EXAMPLE 19

A casting is prepared using procedure of Example 13, but with a charge of 15% elastomer prepared in Example 8 and 85% MMA. The casting is semi-rigid, very tough, and has a slight haze.

EXAMPLE 20

A casting is prepared using procedure of Example 13, but with a charge of 15% elastomer prepared in Example 9 and 85% MMA. The casting is tough and rigid.

EXAMPLE 21

A casting is prepared using procedure of Example 13, but with a charge of 15% elastomer prepared in Example 10 and 85% MMA. Typical values obtained on the sheet include a Young's modulus of 286,000 p.s.i. and a VH Impact of 16 in-lbs.

EXAMPLE 22

A casting is prepared using procedure of Example 13, but with a charge of 10% of the elastomer of Example 11 and 90% MMA. Typical values obtained on the white translucent sheet include VH Impact of 22 inch-lbs. and Young's modulus less than 100,000 p.s.i.

What is claimed is:

1. As a composition of matter, a condensation product
   (A) a reaction product of
   (1) diisocyanate selected exclusively from aliphatic and cycloaliphatic diisocyanates,
   (2) a linear condensation polymer containing terminal hydroxyl groups, and
   (3) a polyol having at least two hydroxyl groups, the ration of (1) to the total of (2) and (3) being in the range of 1.001 to 2.0 equivalents of (1) per equivalent of the total of (2) and (3) and sufficient to provide in the reaction product an equivalent weight as determined by isocyanate titration of at least 4,000, the amount of (3) relative to (2) on an equivalent basis being between 0.1:0.9 and 0.9:0.1, with (B) a reactive hydrogen-containing monoethylenically unsaturated monomer in which the reactive hydrogen is in a hydroxyl or amine group, an excess of (B) being used to effect reaction of all the isocyanate groups in (A).

2. As a composition of matter, a solution in an ethylenically unsaturated monomeric material of the condensation product of claim 1.

3. A solution according to claim 2 in which the monomeric material consists essentially of a mixture of 55 to 100% by weight of an alkyl methacrylate which, when homopolymerized produces a polymer having a $T_g$ greater than 90° C., 0 to 45% by weight of at least one other monoethylenically unsaturated monomer, and 0 to 5% by weight of a monomer selected from polyethylenically unsaturated monomers and highly polar monoethylenically unsaturated monomers.

4. A solution in accordance with claim 3 in which the monomeric material in which the condensation product is dissolved constitutes about 95 to 50% by weight of the solution.

5. A solution according to claim 2 in which at least 90% by weight of the monomeric material is methyl methacrylate and the monomeric material constitutes about 95 to 50% by weight of the solution.

6. As an article of manufacture, the free racidal addition polymerization product of the solution of claim 4 in the form of a sheet.

7. As an article of manufacture, the free radical addition polymerization product of the solution of claim 5 in the form of a sheet.

8. A sheet according to claim 6 thermoformed under heat and pressure to a sign face.

9. As a composition of matter, a condensation product of
(A) a reaction product of
  (1) diisocyanate selected exclusively from aliphatic and cycloaliphatic diisocyanates,
  (2) a hydroxy-terminated linear
    (a) polyether of the general formula

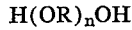

wherein R is a hydrocarbon radical and $n$ is an integer sufficiently high to give a molecular weight of about 500 to about 5000 or
    (b) polyester of a dicarboxylic acid and a diol and
  (3) a polyol selected from the group consisting of 1,3-butylene glycol, 1,4-butylene glycol, thiodiethylene glycol, neopentylene glycol, trimethylol propane and mixtures thereof, the ratio of (1) to the total of (2) and (3) being in the range of 1.001 to 2.0 equivalents of (1) per equivalent of the total of (2) and (3) and sufficient to provide in the reaction product an equivalent weight as determined by isocyanate titration of at least 4,000, the amount of (3) relative to (2), on an equivalent basis being between 0.1:0.9 and 0.9:0.1,
with
(B) a reactive hydrogen-containing monoethylenically unsaturated monomer in which the reactive hydrogen is in a hydroxyl or amine group, an excess of (B) being used to effect reaction of all the isocyanate groups in (A).

10. As a composition of matter, a solution in an ethylenically unsaturated monomeric material of the condensation product of claim 9.

11. A solution according to claim 10 in which the monomeric material constitutes 50 to 95% by weight of the solution and consists essentially of a mixture of 55 to 100% by weight of an alkyl methacrylate which, when homopolymerized produces a polymer having a $T_g$ greater than 90° C., 0 to 45% by weight of at least one other monoethylenically unsaturated monomer, and 0 to 5% by weight of a monomer selected from polyethylenically unsaturated monomers and highly polar monoethylenically unsaturated monomers.

12. As an article of manufacture, the free radical addition polymerization product of the solution of claim 11 in the form of a sheet.

13. A solution according to claim 11 wherein the polyester (2) is the condensation product of a dicarboxylic acid and a diol or a mixture of diols.

14. A composition in accordance with claim 13 wherein (2) is a polyester of a diol selected from the group consisting of ethylene glycol, propylene glycol, thiodiethylene glycol and mixtures thereof.

15. A composition in accordance with claim 14 wherein the dicarboxylic acid of the linear polyester (2) is selected from the group consisting of adipic, sebacic and fumaric acids.

16. As a composition of matter, the product of addition polymerization of the composition of claim 15.

17. As an article of manufacture, the free radical addition polymerization product of the solution of claim 15 in the form of a sheet.

18. As an article of manufacture, the free radical addition polymerization product of the solution of claim 15 in the form of a thermoformed sign.

19. As a composition of matter, a condensation product of
(A) a reaction product of
  (1) diisocyanate selected exclusively from aliphatic and cycloaliphatic diisocyanates,
  (2) a hydroxy-terminated linear polyester of adipic acid and a polyol selected from the group consisting of ethylene glycol, propylene glycol thiodiethylene glycol and mixtures thereof, and
  (3) a polyol selected from the group consisting of 1,3-butylene glycol, 1,4-butylene glycol, thiodiethylene glycol, neopentylene glycol, trimethylol propane and mixtures thereof, the ratio of of (1) to the total of (2) and (3) being in the range of 1.001 to 2.0 equivalents of (1) per equivalent of the total of (2) and (3) and sufficient to provide in the reaction product an equivalent weight as determined by isocyanate titration of at least 4,000, the amount of (3) relative to (2), on an equivalent basis being between 0.1:0.9 and 0.9:0.1,
with
(B) a reactive hydrogen-containing monoethylenically unsaturated monomer in which the reactive hydrogen is in a hydroxyl or amine group, an excess of (B) being used to effect reaction of all the isocyanate groups in (A).

20. As a composition of matter, the product of polymerization of a solution of (C) the condensation product of claim 19 in (D) a monomeric material constituting 50 to 95% by weight of the solution and comprising 55 to 100% by weight of an alkyl methacrylate which, when homopolymerized produces a polymer having a $T_g$ greater than 90° C., 0 to 45% by weight at least one other monoethylenically unsaturated monomer, and 0 to 5% by weight of a monomer selected from polyethylenically unsaturated monomers and highly polar monoethylenically unsaturated monomers.

21. A product according to claim 1 wherein the equivalent ratio between the polyol (3) and the polyester (2) is between 0.5:1.0 and 1.0:0.5.

22. A product according to claim 1 wherein the polyol (3) is at least one diol containing 3 to 8 carbon atoms.

23. A product according to claim 20 wherein the components (1), (2), and (3) are chosen to yield a refractive index within 0.08 of that of the copolymer obtained from the components of (D).

24. A product according to claim 20 wherein the component (A) has an equivalent weight of 4,000 to 50,000.

25. A product according to claim 20 wherein the condensation product (C) comprises 40 to 60 mole percent (1), 30 to 60 mole percent (2) and up to 10 percent (B).

26. A product according to claim 25 wherein the condensation product (C) comprises the residue of 15 to 24.9 mole percent of a saturated polyester (2) containing active hydrogen sites, 15 to 25 mole percent of polyol (3), 50 to 60 mole percent of a saturated aliphatic or alicyclic diisocyanate (1) and 0.1 to 10 percent of an ethylenically unsaturated compound (B) having active hydrogen functionality.

27. As an article of manufacture, the product of claim 20 in the form of a sheet.

28. As an article of manufacture, the product of claim 20 in the form of a thermoformed sign face.

References Cited

UNITED STATES PATENTS

| | | | |
|---|---|---|---|
| 3,297,745 | 1/1967 | Fekete | 260—77.5 |
| 3,368,988 | 2/1968 | Sekmakas | 260—77.5 |
| 3,509,234 | 4/1970 | Burlant | 260—859 |
| 3,531,364 | 9/1970 | Schmidle | 260—859 |

PAUL LIEBERMAN, Primary Examiner

U.S. Cl. X.R.

260—75 NK, 75 NP, 75 NA, 77.5 AM, 77.5 CR